United States Patent
Axelrod et al.

(10) Patent No.: US 8,771,775 B2
(45) Date of Patent: Jul. 8, 2014

(54) MULTI LAYER EXTRUSION

(75) Inventors: Glen S. Axelrod, Colts Neck, NJ (US); Ajay Gajria, Maharashtra (IN)

(73) Assignee: T.F.H. Publications, Inc., Neptune, NJ (US)

( * ) Notice: Subject to any disclaimer, the term of this patent is extended or adjusted under 35 U.S.C. 154(b) by 453 days.

(21) Appl. No.: 12/422,544

(22) Filed: Apr. 13, 2009

(65) Prior Publication Data

US 2010/0260905 A1    Oct. 14, 2010

(51) Int. Cl.
*A23P 1/12*    (2006.01)

(52) U.S. Cl.
USPC .......................... 426/516; 426/805; 119/710

(58) Field of Classification Search
CPC .... A21K 1/003; A01K 15/025; A01K 15/026
USPC .................. 426/512, 514–516; 425/576, 588, 425/462–463, 465; 119/709–711
See application file for complete search history.

(56) References Cited

U.S. PATENT DOCUMENTS

| | | | |
|---|---|---|---|
| 2,967,128 A | 1/1961 | Kare et al. | |
| 3,474,176 A | 10/1969 | Freeman et al. | |
| 4,178,411 A | 12/1979 | Cole et al. | |
| 4,405,547 A * | 9/1983 | Koch et al. | 264/173.16 |
| 4,449,987 A | 5/1984 | Lindauer | |
| 4,451,460 A | 5/1984 | Hansen et al. | |
| 4,542,162 A | 9/1985 | Rutherford et al. | |
| 4,552,307 A | 11/1985 | Stedham | |
| 4,600,461 A | 7/1986 | Guy | |
| 5,364,626 A | 11/1994 | Hasegawa et al. | |
| 5,456,916 A | 10/1995 | Kurata et al. | |
| 5,501,868 A | 3/1996 | Collings et al. | |
| 5,741,553 A | 4/1998 | Manolas et al. | |
| 5,834,040 A * | 11/1998 | Israel et al. | 425/381 |
| 5,985,010 A | 11/1999 | Etscorn et al. | |
| 6,280,667 B1 | 8/2001 | Koenig et al. | |
| 6,391,352 B1 * | 5/2002 | Hawkes et al. | 426/96 |
| 6,395,290 B2 | 5/2002 | Brown | |
| 6,468,554 B1 | 10/2002 | Ichino | |
| 6,586,027 B2 | 7/2003 | Axelrod | |
| 6,908,643 B2 | 6/2005 | Landers | |
| 6,916,497 B2 | 7/2005 | Axelrod | |
| 7,287,489 B1 | 10/2007 | O'Brien | |
| 2002/0106392 A1 | 8/2002 | Ichino | |
| 2002/0110576 A1 | 8/2002 | Messina | |

(Continued)

FOREIGN PATENT DOCUMENTS

CN    101223937    7/2008

OTHER PUBLICATIONS

International Search Report and Written Opinion dated Jul. 14, 2010 issued in related International Patent Application No. PCT/US10/35059.

(Continued)

*Primary Examiner* — Steven Leff
(74) *Attorney, Agent, or Firm* — Grossman, Tucker, Perreault & Pfleger, PLLC

(57) ABSTRACT

A pet chew may be manufactured by co-extruding multiple compositions to form a layered construction. Separate extruders may be provided to tailor processing conditions to heat and/or shear sensitive compositions, such as nutritional additives, and the respective extrudates may be combined such that relatively higher levels of nutritional compositions may be provided as an outer layer.

10 Claims, 2 Drawing Sheets

(56) References Cited

U.S. PATENT DOCUMENTS

| | | | |
|---|---|---|---|
| 2004/0213743 A1 | 10/2004 | Ichino | |
| 2004/0237899 A1 | 12/2004 | Fung | |
| 2005/0147638 A1 | 7/2005 | Landers | |
| 2005/0214349 A1 | 9/2005 | Nie et al. | |
| 2005/0214351 A1 | 9/2005 | Chew | |
| 2006/0188611 A1* | 8/2006 | Unlu et al. | 426/89 |
| 2006/0288956 A1 | 12/2006 | Miller et al. | |
| 2007/0212456 A1 | 9/2007 | Axelrod | |
| 2007/0264415 A1 | 11/2007 | Axelrod | |
| 2007/0289552 A1* | 12/2007 | Axelrod et al. | 119/710 |
| 2008/0233243 A1 | 9/2008 | Axelrod et al. | |

OTHER PUBLICATIONS

Brncic, et al. Effect of Twin-Screw Extrusion Parameters on Mechanical Hardness of Direct-Expanded Extrudates. Sadhanna, Oct. 2006, vol. 31, Part 5, pp. 527-536.

International Search Report and Written Opinion from Corresponding PCT Application No. PCT/US2010/29603 dated Jun. 3, 2010.

Gregrobert Quality Pet Supplies, "Grannicks Bitter Apple for Cats Pet Dabber 4oz," available at http://www.pet-dog-cat-supply-store.com/shop/index.php?page=shop-flypage-12019; retrieved on Mar. 28, 2009.

Gregrobert Quality Pet Supplies, "Products for Dog Chewing Problems," http://www.pet-dog-cat-supply-store.com/shop/chewing.php; retrieved on Mar. 28, 2009.

Makepolo, "Coperion Keya (Nanjing) Machinery Co. Ltd.," available at ckcmkpl.en.makepolo.com/productshow/4226039.html; retrieved on Mar. 24, 2009.

CTE Product Description: CTE Compounding Extruder, available at http://www.plastic-machinery-manufacturer.com/CTE-Compounding-extruder-23.html; retrieved on Mar. 24, 2009.

Office Action from corresponding Chinese Appln. No. 201080017091.X dated Jul. 1, 2013.

* cited by examiner

MULTI LAYER EXTRUSION

FIELD

The present disclosure relates to pet chews formed by extrusion and, more particularly, to the use of multiple extruders of different size as well as different processing parameters such that selected layers of the pet chew experience differential heat histories and/or shearing histories than any of the other layers. In such manner, selected layer may include ingredients that may otherwise degrade when exposed to elevated temperatures and elevated shearing conditions.

BACKGROUND

U.S. application Ser. No. 11/372,992 filed Mar. 10, 2006, which is commonly assigned to the assignee of the present disclosure and included herein by reference in its entirety, is directed at animal chews comprising more than one material wherein the materials may be different in, for instance, hardness, flexural modulus, tensile strength, clarity or composition. The materials may be disposed in layered relationship. The chews may be formed by insert molding, multiple component molding, rotary molding, shuttle molding or any number of melt conversion processes.

U.S. Pat. No. 6,916,497 issued on Jul. 12, 2005 and commonly assigned to the assignee of the present disclosure is also included herein by reference in its entirety. It is directed at a vitamin and/or mineral and/or herbal enriched molded animal chew toy. The vitamins, minerals and/or herbal additives may be incorporated into the molded chew toy under conditions that minimize thermal degradation of such additives, such as by the inclusion of water during processing. The chew toy may be formed by combining resin, water and one or a plurality of said vitamins and/or minerals and/or herbs to form a mixture. The resin may include any and all resins that can be made to flow under conditions of elevated temperature and can be molded and cooled into a desired shape. Resins therefore include natural and/or synthetic macromolecules or polymeric type structures, including thermoplastic polymers, starch, casein, denatured and partially hydrolyzed collagen and mixtures thereof.

U.S. application Ser. No. 11/747,132 filed May 10, 2007, and which is commonly assigned to the assignee of the present disclosure and included herein by reference in its entirety is directed at a method of manufacturing a multi-component pet treat or chew comprising two or more materials which may differ in some physical, optical, nutritional, sensual or compositional property, wherein the multiplicity of materials may be formed to lie adjacent one another in layered, surrounding, partially surrounding, abutting or interlocked fashion. This application is focused upon the injection molding process.

The prior art discloses various processes and compositions for enhancing the palatability of pet foods, however, it will be appreciated by those skilled in the art that a need continues to exist for improved methods and compositions which will allow both pet foods and pet chews to deliver the vitamins, minerals and other nutritional additives that may normally be degraded during the manufacture of such extruded pet products.

A more cost efficient process may be to simultaneously extrude multiple compositions, combine such in an extrusion die and then cut the extrudate to length to form various shapes as pet chews having discrete sections of shape and composition. Operating separate extruders for each composition may allow one to tailor the processing conditions to allow such ingredients as herbs, minerals, vitamins and natural colorants to be processed under conditions that minimize their heat and/or shear history and reduce thermal degradation.

SUMMARY

In a first exemplary embodiment, the present disclosure is directed at a process for forming a pet chew comprising providing a first extruder and a second extruder and providing a first composition containing a nutritional additive to said first extruder and a second composition to said second extruder. This may then be followed by processing the first and second compositions through the first and second extruders to form first and second extrudates which may then be joined to one another. The first extruder may be configured to operate at a selected barrel temperature ($BT_1$), including a selected residence time for the first composition ($RT_1$) and a selected shear rate ($\gamma_1$). The second extruder may be configured to operate at a selected barrel temperature ($BT_2$), a selected residence time for the second composition ($RT_2$) and a selected shear rate ($\gamma_2$). At least one or more of the following conditions may then be present: $BT_1 < BT_2$; $RT_1 < RT_2$ or $\gamma_1 < \gamma_2$.

In a second exemplary embodiment, the present disclosure is directed at a process for forming a pet chew comprising providing a first extruder, a second extruder and a third extruder and providing a first composition containing a nutritional additive to the first extruder and a second composition to the second extruder and a third composition containing a nutritional additive to the third extruder. This may then be followed by processing the first, second and third compositions through the first, second and third extruders to form first, second and third extrudates which may be joined to one another. The first extruder is configured to operate at a selected barrel temperature ($BT_1$), including a selected residence time for the first composition ($RT_1$) and a selected shear rate ($\gamma_1$). The second extruder is configured to operate at a selected barrel temperature ($BT_2$), a selected residence time for the second composition ($RT_2$) and a selected shear rate ($\gamma_2$). The third extruder is configured to operate at a selected barrel temperature ($BT_3$), a selected residence time for the third composition ($RT_3$) and a selected shear rate ($\gamma_3$). At least one or more of the following conditions is present: $BT_1 < BT_2$; $RT_1 < RT_2$; or $\gamma_1 < \gamma_2$. In addition, at least one or more of the following conditions is present: $BT_3 < BT_2$; $RT_3 < RT_2$; $\gamma_3 < \gamma_2$. Optionally, the extrudates may be joined to one another wherein the first and third extrudates provide an outer layer and the second extrudate provides a core. In addition, the first and third extrudates may provide the core and the second extrudate may provide a surrounding layer about such core.

In a third exemplary embodiment, the present disclosure is directed at a process for forming a pet chew comprising providing a first extruder, a second extruder and a third extruder and providing a first composition containing a nutritional additive to the first extruder and a second composition to the second extruder and a third composition containing a nutritional additive to the third extruder. This may then be followed by processing the first, second and third compositions through the first, second and third extruders to form first, second and third extrudates which may be joined to one another. The first extruder is operating at a selected barrel temperature ($BT_1$), including a selected residence time for the first composition ($RT_1$) and a selected shear rate ($\gamma_1$). The second extruder is operating at a selected barrel temperature ($BT_2$), a selected residence time for the second composition ($RT_2$) and a selected shear rate ($\gamma_2$). The third extruder is operating at a selected barrel temperature ($BT_3$), a selected residence time for the third composition ($RT_3$) and a selected shear rate ($\gamma_3$). The following conditions are present: $BT_1<BT_2$; $RT_1<RT_2$ and $\gamma_1<\gamma_2$. In addition, the following conditions are present: $BT_3<BT_2$; $RT_3<RT_2$; $\gamma_3<\gamma_2$. Optionally, the extrudates may be joined to one another wherein the first and third extrudates provide an outer layer and the second extrudate provides a core. In addition, the first and third extrudates may provide the core and the second extrudate may provide a surrounding layer about such core.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

To provide variety for a pet, it may be desirable to provide pet chews that, in addition to being nutritional, may comprise a variety of shapes and sizes including a variety of layers. Further, additional variety may be provided by including a variety of actual shapes disposed within the outer shape of the pet chew, or adjacent one another, the variety of shapes differing in such properties as, for instance, color, composition, hardness, odor, taste and nutritional value.

To accomplish this, a plurality of extruders of different throughputs may be provided each processing a specific composition and having a set of processing conditions and/or processing apparatus tailored to the composition. Each extruder may then feed a specifically shaped extrusion die from which the extrudates may be fed to a final shaping die for the pet chew. In this manner, thermally sensitive materials and/or shear sensitive materials may be individually processed under specific conditions that may not significantly deteriorate their nutritional effectiveness. In addition, such materials who nutritional value may be relatively preserved may be joined with other extrudates which are not as heat and/or shear sensitive in a common shaping die to form multi-layered pet chews.

Figure 4:
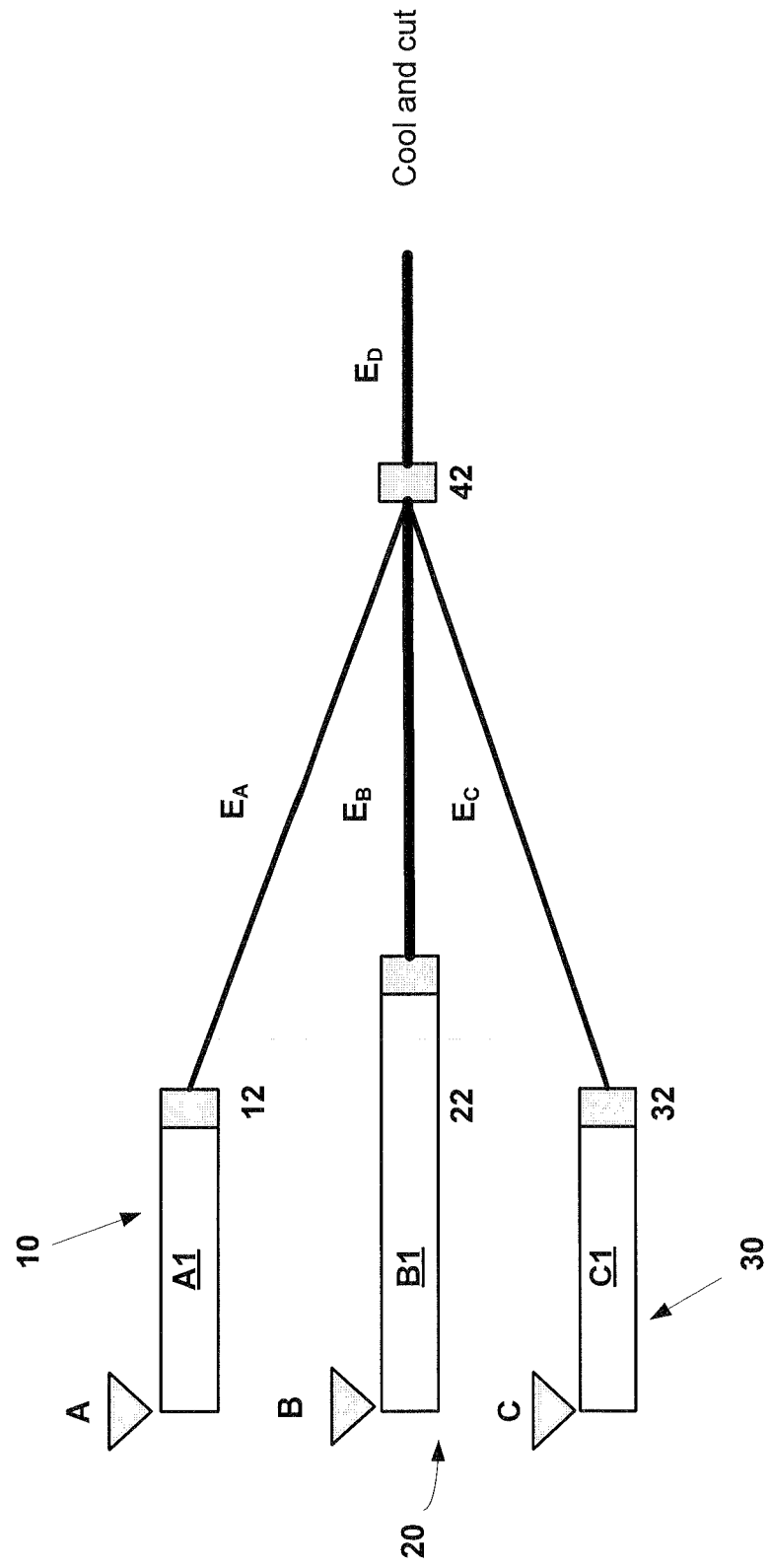
FIG. 4 is a schematic flow chart illustrating the formation of a pet chew from three separate extruders of different capacities, according to the present disclosure.

In one exemplary embodiment, as shown in FIG. 4, extruder 10 including composition A and being operated under processing conditions A1 may extrude composition A through die 12 to form an intermediate-shaped extrudate $E_A$. Intermediate-shape extrudate as shown may be configured to provide the outer layer of a given pet chew. Processing conditions A1 may include selected barrel temperatures ($BT_A$), residence times ($RT_A$) and/or shear rates ($\gamma_A$).

Extruder 20, having a higher throughput and including composition B and being operated under higher temperature processing conditions B1, may extrude composition B through die 22 to form a second intermediate-shaped extrudate $E_B$. Intermediate-shaped extrudate $E_B$ may be configured to provide the inner layer of a given pet chew. Accordingly, processing conditions B1 may include selected barrel temperatures ($BT_B$), residence times ($RT_B$) and/or shear rates ($\gamma_B$).

Optionally, one may provide extruder 30 that includes composition C and being operated under processing conditions C1 may extrude composition C through die 32 to form an intermediate shaped extrudate $E_C$. Intermediate-shape extrudate $E_C$ as shown may be configured to provide an outer layer of a given pet chew. Processing conditions C1 may include selected barrel temperatures ($BT_C$), residence times ($RT_C$) and/or shear rates ($\gamma_C$).

With respect to the above processing conditions A1, B1, and C1, it may now be appreciated that $BT_A<BT_B$ and/or $RT_A<RT_B$ and/or $\gamma_A<\gamma_B$. In addition, $BT_C<BT_B$ and/or $RT_C<RT_B$ and/or $\gamma_C<\gamma_B$. In such manner, one may form a two layer pet treat (i.e. containing extrudates $E_A$ and $E_B$) or one may form a pet chew having $E_A$ and $E_C$ as the outer layers with extrudate $E_B$ forming the core.

Expanding upon the above, reference to a barrel temperature is reference to a temperature within the extruder at any location within the extruder barrel. It may therefore be appreciate that when indicating that, e.g., $BT_A<BT_B$, it may be the case that the highest temperature of the barrel of extruder 10 is less than the highest temperature of the barrel of extruder 20. It may also be the case that that the temperature at all locations of the barrel in extruder 10 is less than the temperature at all locations of the barrel in extruder 20. In addition, the above discussion of comparative temperatures applies to the temperatures of the barrels of extruder 30 relative to extruder 20.

Similarly, it may also be appreciated that when indicating that, e.g., $\gamma_A<\gamma_B$, it may be the case that the highest relative shear rate in the barrel of extruder 10 is less than the highest relative shear rate in the barrel of extruder 20. It may also be the case that that the shear rate at all locations in the barrel in extruder 10 is less than the shear rate at all locations in the barrel in extruder 20. In addition, the above discussion of comparative shear rates applies to the shear rates in the barrels of extruder 30 relative to extruder 20. In addition, it may be noted that the shear rate range for any one of extruder 10, 20 or 30 may be from 1 $sec^{-1}$ to 5,000 $sec^{-1}$. Accordingly, if $\gamma_B$ has a value of 1000 $sec^{-1}$, $\gamma_A$ and/or $\gamma_C$ may have a value less than 1000 $sec^{-1}$, such as 900 $sec^{-1}$ or 800 $sec^{-1}$ or 700 $sec^{-1}$, etc.

Figure 1:
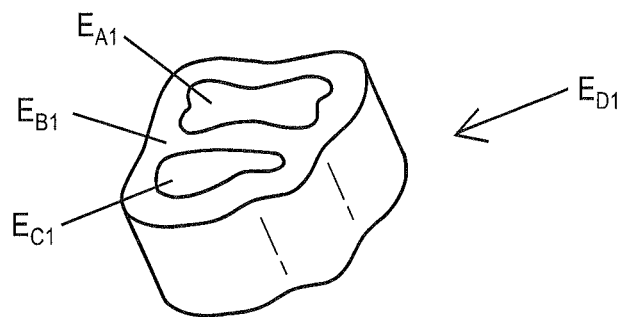
FIG. 1 is a perspective view of an exemplary pet chew having the shape of a cut of meat and having a bone shaped portion and a chop shaped portion disposed therein.
Figure 2:
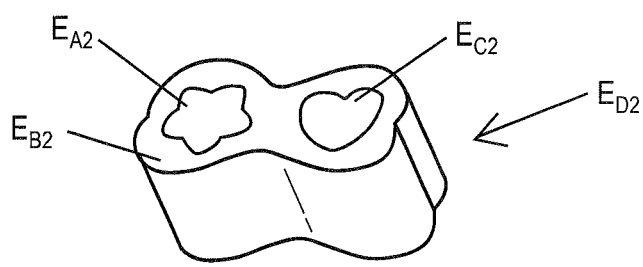
FIG. 2 is a perspective view of an exemplary pet chew having a bone shape and having a star shaped portion and a heart shaped portion disposed therein.
Figure 3:
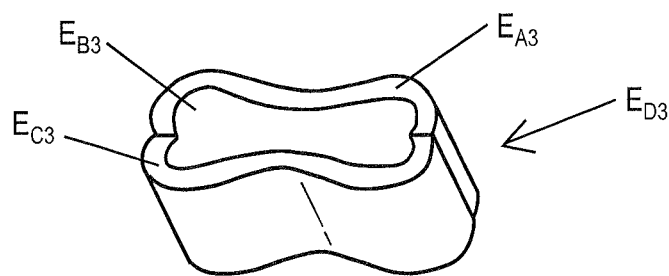
FIG. 3 is a perspective view of an exemplary pet chew having a bone shaped portion disposed inside of a larger dog bone shape comprising two different compositions.

Extrudates $E_A$, $E_B$ and $E_C$ may be directed through a combining die 42 to form a given final shape, extrudate $E_D$, which may then be cooled and cut to length to form pet chews having shapes examples of which as shown in FIGS. 1-3.

As can be seen, FIG. 1 illustrates a pet chew $E_{D1}$ with a dog bone shaped portion $E_{A1}$ and a chop shaped portion $E_{C1}$ disposed within an outer surrounding portion $E_{B1}$ resembling a cut of meat, each individual shape $E_{A1}$, $E_{B1}$, $E_{C1}$ comprising a different composition or other property, the final shape $E_{D1}$ having the appearance of a cut of meat. Due to the relative volumes of the shapes of $E_{A1}$, $E_{B1}$, $E_{C1}$, different sized extruders having different throughputs, process conditions and providing different heat histories to different compositions, some of which may be heat sensitive, may be utilized.

FIG. 2 illustrates a pet chew $E_{D2}$ having a different shape, in this case a star shaped portion $E_{A2}$ and a heart shaped portion $E_{C2}$ disposed within an overall bone dog shape $E_{B2}$, each individual shape comprising a different composition or other property, for instance $E_{A2}$ and $E_{C2}$ may be compositions having different heat sensitive colors which must be processed under relatively lower temperatures than the composition of $E_{B1}$.

FIG. 3 illustrates a pet chew $E_{D3}$ having an overall bone shape $E_{B3}$ disposed within a larger bone shape, the larger bone shape comprising two different extrudates $E_{A3}$ and $E_{C3}$ disposed longitudinally to surround $E_{B3}$, each individual shape comprising a different composition or other property, in this case the compositions of $E_{A3}$ and $E_{C3}$ may include vitamins, minerals and/or herbs which may be otherwise degraded by thermal melt processing.

As noted above, extrudates $E_{A3}$ and $E_{C3}$ may be processed under specific conditions (barrel temperature, shear rates and residence times) to minimize the observed thermal and/or shear history, and provide relatively greater levels of nutrients to the outer layers of a pet chew. In other words, the outermost layers may be extruded under processing conditions that minimize thermal degradation of such additives/ingredients, while the innermost layer may be configured from a composition that either avoids the use of the outer layer additives, or contains a composition that is relatively more stable to higher relative barrel temperatures, higher relative shear rates and/or higher extrusion residence times.

As can also be seen, the ability to regulate the differential barrel temperatures, shear rates and/or residence times may be accomplished by varying the relative size of the throughput of each extruder according to the relative volume of the portion of the pet chew being formed. As may be seen, the outer layers may have a thickness that is less than the thickness of the inner layer.

Turning next to a consideration of the incorporation of the vitamins/minerals and/or herb additives of the present disclosure, it may as noted be desirable that such additives may be selectively concentrated in the surface of the extruded/molded chew as, for instance, in an outer layer, $E_A$ or $E_C$, (FIG. 3) so that they may be delivered to the animal prior to the animal's possible loss of interest in the pet chew at issue. In such regard, the present disclosure identifies the process of simultaneously extruding multiple streams having different resin compositions and combining the extrudates in a shaping die to make an combined extrudate, $E_D$ in FIG. 4, that may be cooled and cut to length to provide a pet chew. Extrudate $E_D$ may therefore include layers $E_A$ or $E_C$ that contain adequate nutrients whereas $E_B$ is configured not to contain any nutrients, thereby allowing $E_B$ to be prepared with the relatively longer residence times, higher barrel temperatures, and higher shear rates, as noted herein.

In that regard, a starch or other resin-based composition without vitamins/minerals and/or herbs may serve as the core, $E_{B3}$, or inner layer of the pet chew and a starch or other resin-based composition which includes vitamins/minerals and/or herbs or other relatively more heat sensitive ingredient may serve as the outer layer(s). The concentration of vitamins/minerals and/or herbs of either the inner layer(s) or outer layer(s) may then be varied according to any desired level. The thickness and shape of the inner layer and outer layer(s) may be dictated by the shape of the dies 12, 22, 32 in FIG. 4 and as generally shown, in exemplary fashion, in FIG. 3.

With reference to such technique of multiple stream extrusion, it can be appreciated that this may uniquely allow for the extrusion of, e.g., a starch outer layer(s) with additives (vitamins, minerals, herbs) under processing conditions wherein the water level may be higher than that of the core. For example, the outer layer composition may comprise water levels, prior to extrusion, of between 20-40% wherein the starch/water mixture for the core may be made to contain water levels that are lower than any level selected for the outer layer(s). One preferred example may be to extrude the outer layer(s) having a level of between 20-40% water, whereas the inner core may be extruded at levels between 10-15% water, by weight. This may then provide a differential hardness to the outer layer relative to the inner layer, with the outer layer be relatively softer than the inner layer. Such differential hardness may amount to a different of at least 10 or more on the Shore A scale. For example, the difference in hardness may be such that the outer layer is has a Shore A hardness that is 10-80 units less than the Shore A hardness of the inner core.

The disclosure herein therefore provides the ability to selectively concentrate a vitamin, a mineral and/or a herb at or within one or both of the outer layers which may then insure the relatively more efficient delivery of the nutrients to a given animal. This can be accomplished by multiple stream extrusion along with the processing control noted herein.

Accordingly, by incorporating the aforementioned additives in a starch/water combination, the invention herein expands upon the use of water to promote melt mixing of such additives with the starch without thermal degradation during plastication (softening for use in a melt-processing operation) in the extrusion equipment. Those skilled in the art will therefore recognize that the amount of water can be readily varied as may be necessary to allow for relatively lower melt processing temperatures to insure against additive (vitamin, mineral, herb, colorant, etc.) thermal degradation In an exemplary embodiment, one or more resin components, one or more thermally sensitive additives and, optionally one or more plasticizers, may be fed to the screw barrel of a heated extruder 10 (see FIG. 4) and plasticated by the rotation of a screw at a temperature and at a pressure for a time long enough to form what is termed as a melt, and extruding the melt of through a die 12 to form an extrudate $E_A$ having an intermediate shape. Similarly, another extruder 30 may be fed with the same or a somewhat different composition which may be heated and plasticated and fed through a die 32 to form an extrudate $E_C$ having an intermediate shape. Finally, another extruder 20 may be fed with the a different composition, for instance one which does not contain thermally sensitive and/or shear-sensitive nutrients, which may be heated and plasticated (sheared) and fed through a die 22 to form an extrudate $E_B$ having an intermediate shape.

As shown in FIG. 4, these three extrudates $E_A$, $E_B$ and $E_C$ may be fed into shaping die 42 to form an extrudate $E_D$ that may be cooled and cut to length to form a pet chew (see FIGS. 1-3) having areas with different levels of nutrients, the nutrients within the outer layer having been treated such that degradation due to heat and/or shearing may be reduced.

It should also be noted that the temperatures of extrudates $E_A$, $E_B$ and $E_C$ may be maintained at a level such that they will bond or flow together when drawn through the shaping die and subsequently cooled to form an integral shape. In one exemplary embodiment, extrudate $E_B$ (containing no nutritional additives) may surround extrudates $E_A$ and $E_C$ which contain nutritional additives (FIGS. 1 and 2) while in another exemplary embodiment (FIG. 3) extrudates $E_A$ and $E_C$ which contain nutritional additives may surround extrudate $E_B$ which as noted does not contain nutritional additive. As shown in FIGS. 1-3, the three extrudates $E_A$, $E_B$ and $E_C$ may each have different profile shapes. By the term "profile shape", it is understood to mean the shape of a section taken normal to the length of an extrudate.

Any type of single or twin screw extruder may be employed for extruders 10, 20 and 30 as illustrated in FIG. 4. For example, a single screw extruder may be employed for the heat sensitive materials and a twin screw extruder for the larger volume of relatively less heat sensitive materials, or vice-versa. Representative parameters of the extruders for extruding each of the three compositions A, B and C are listed in the Table 1. Where the water level charged in the extruder is lowered during the course of extrusion, a vented barrel extruder may be employed, wherein such venting lowers the water level to a desired level. To facilitate such water level change, it has been found particularly useful to apply a light vacuum to the extruder barrel at the vent port, to thereby provide a more efficient removal of water from the extrudate therein.

TABLE 1

| | Comparative Extruder Parameters | |
|---|---|---|
| | $E_A$ and $E_C$ | $E_B$ |
| Throughput | 50-150 kg/hr | 300-600 kg/hr |
| Screw Diameter | 70 mm. | 72 mm. |
| Screw Length | 940 mm. | 2300 mm. |
| L/D | 13 | 32 |
| Extruder Type | single screw | twin screw |
| Initial $H_2O$ Level | 20-40% | 10-15% |
| Max. Heating Zone | 300° F. | 390° F. |

In order to process compositions A, B and C, one or more of which may contain thermally sensitive materials that may degrade upon heating, the extruders which will process the compositions containing the thermally sensitive materials (for instance, 10 and 30) may be relatively shorter in length than the extruder 20 which will process the resin composition without the thermally and/or shear sensitive materials. This may then allow such compositions as A and C which will form the outer layer(s) of the pet chew in FIG. 3 to operate with a relatively shorter residence time and at a lower temperature than the extruder 20 which may form the inner layer of the pet chew (FIG. 3) and not include thermally sensitive additives.

In an exemplary embodiment, a resin component, comprising, for instance, starch, casein, denatured and partially hydrolyzed collagen, thermoplastic polymers and mixtures thereof may provide a base ingredient for an edible pet chew. Thermoplastic polymers may include polymers such as polyamides and polyurethanes, as well as ethylene copolymers, such as poly(ethylene acrylic acid) and poly(ethylene vinyl alcohol). In addition, the resin compositions for extrusion may include textured vegetable protein (TVP), carbohydrates, rawhide and meat jerky. In addition, water, glycerine, as well as other plasticizers may be included in the composition to form a pet chew according to the present disclosure.

As noted, it is contemplated that plasticizers may be employed to improve the plastication and processing of the resin component during extrusion. As such, the plasticizers may include compounds that have a molecular weight of less than or equal to about 2500. Plasticizers may therefore include water, and the plasticizers may be selected such that they may be removed (volatilized) from a given mixture during processing in the extruder. The plasticizers may also be designed to remain in the final molded product. For example, while a relatively high water content (e.g. 40% by weight) may be desired for plastication of a resin such as starch, portions of the final pet chew may have a plasticizer level therein of less than or equal to about 20% by weight, including all values and increments therein.

Accordingly, in connection with the present disclosure, the vitamins, minerals and/or herbs may be added to the starch and water, or to another resin component, prior to extrusion. It is worth noting that in the context of the present disclosure, it has been uniquely appreciated that vitamin, mineral, herb, phytonutrient, enzyme and antioxidant additives herein can be extruded with a resin component without significant thermal and/or shear degradation of such additives which degradation may attenuate or eliminate their therapeutic effect. As noted above, it is therefore preferable that at least some portion of the additives remain non-degraded. Those skilled in the art will therefore recognize that in the case of the additives herein, levels as low as 50 ppm. may be suitable.

More preferably however, at least 25% by weight or more or more of the additives may remain non-degraded, preferably at least 50% or more by weight, more preferably 75% or more, and even more preferably at least 80-100% by weight, and in the most preferred embodiment, over 90% by weight of the additives are not thermally and/or shear degraded by the extrusion process. Therefore, in the context of the present invention, the amount by weight of the nutritional additive that remains non-degraded may be from 25% by weight to 100% by weight, including all values therein, in 1.0% increments.

Degradation may be established by, e.g., extraction of the nutrient (e.g. vitamin) from the extrudate and determining whether or not the chemical structure of said nutrient has been altered by the temperature and/or shear history profile selected. For example, one may utilize spectral techniques such as infrared spectroscopy and/or NMR spectroscopy to establish the structural integrity of the nutrient at issue. This approach may then allow such additives to be uniquely distributed in the pet chew of the present disclosure and in a relatively preserved state such that their nutritional or therapeutic value may be maintained at acceptable levels.

The molded pet chew of the present disclosure may contain one or more of those vitamins recommended for dogs by the American Association of Feed Control Officials (AAFCO). In the case of dogs, vitamins may comprise A, C, $B_{12}$, D, E, thiamine, riboflavin, panthothenic acid, niacin, pyridoxine, folic acid and choline. In the case of cats, the vitamins may comprise vitamins A, C, $B_{12}$ D, E, and K, thiamine, riboflavin, pyridoxine, niacin, panthothenic acid, folic acid, biotin and choline.

In addition, the molded chew toy of the present invention may also comprise minerals. In the case of dogs, the preferred minerals may be calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium are only required in mg or .mu.g/day. The pet chew herein can therefore be modified to reflect a higher or lower concentration of a given mineral, according to nutritional requirements.

Turning next to the herbal component, the herbs herein may be selected from the group consisting of St. Johns Wort, Kava Kava, Ginkgo Biloba, Ginseng (Asian or Siberian varieties), EChinacea and mixtures thereof. Other herbs include Catsclaw, Camomile, Golden Seal, Saw Palmetto, Valerina, V. Agnus-Castus, Black Cohosh, Bilberry and Milk Thistle. Herbs may also include aloe, astragalus, burdock, chaomile, chestnut, coriolus, versicolor, couchgrass, crampbark, dandelion root, dong quai, elecampane, evening primrose, eyebright, false unicorn root, feverfew, garlic ginger, goldenseal, gota kola, grape seed extract, green tea, guggulipid, hawthorn, hops, ivy, licorice, milk thistle, misteltoe (American Asian and European varieties), motherwort, oats, osha, passion flower, pumpkin pygeum, red clover, rosemary, sarsparilla, skullcap, saw plametto, stinging nettle, wild indigo, wild yam and yerba mansa. In addition, glucosamines and/or chondroiton may be added to any of the embodiments described herein.

In addition, one may incorporate other types of additives to the pet chew to increase the animal's attraction and/or improve the cosmetic appearance of the molded product. For example, one may optionally incorporate flavorings in the range of about 0.1-5% by weight, as well as a food coloring. Many organic colorants are thermally sensitive and processing such according to the present disclosure may also aid in preserving the original color during processing. In addition, one may optionally incorporate calcium carbonate which has been found to increase the hardness of the pet chews as disclosed herein. Further, one may optionally incorporate a humectant such as oat fiber, in the range of about 0.1-5.0% by weight.

It is further contemplated that the various individual ingredients may be added directly into the extruder barrel and mixed therein or that some or all of the ingredients for a particular composition may be premixed outside of the extruder and then fed to the barrel.

It is further contemplated that "raw" starch may be source of the starch used in the various compositions. By "raw" starch it is understood to mean starch that has not seen a prior thermal molding history, such as extrusion or other type of melt processing step. The raw starch itself may also be native, which may be understood as unmodified starch recovered in the original form by extraction and not physically or chemically modified. The raw starch may also be in powder form of varying particle size, which may be understood as milled and/or pre-sifted. It should be understood that the raw starch may also have varying degrees moisture present. However, the starch herein may, e.g., be heated for drying purposes, which would not amount to a prior thermal molding history.

Accordingly, it should be appreciated that the term "direct" as used herein with respect to extrusion refers to the processing of starch and water wherein the starch and water, and optionally other ingredients, in a given composition may be added directly into the barrel of the extruder without premixing.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, one may practice the invention otherwise than as the description and drawings specifically show and describe.

What is claimed is:

1. A process for forming a pet chew comprising:
    providing a first extruder operable with a first extruder die providing a first extruder die profile shape, a second extruder operable with a second extruder die providing a second extruder die profile shape and a third extruder operable with a third extruder die having a third extruder die profile shape;
    providing a first composition containing a nutritional additive to said first extruder and a second composition to said second extruder and a third composition containing a nutritional additive to said third extruder;
    extrusion processing said first composition through said first extruder and said first extruder die to form a first extrudate having a first extrudate profile shape;
    extrusion processing said second composition through said second extruder and said second extruder die to form a second extrudate having a second extrudate profile shape;
    extrusion processing said third composition through said third extruder and said third extruder die to form a third extrudate having a third extrudate profile shape;
    joining said first extrudate, said second extrudate and said third extrudate to one another with a combining die located downstream of the first extruder die, the second extruder die and the third extruder die;
        wherein said first extruder is operating at a selected barrel temperature ($BT_1$), including a selected residence time for said first composition ($RT_1$) and a selected shear rate ($\gamma_1$);
        wherein said second extruder is operating at a selected barrel temperature ($BT_2$), a selected residence time for said second composition ($RT_2$) and a selected shear rate ($\gamma_2$);
        wherein said third extruder is operating at a selected barrel temperature ($BT_3$), a selected residence time for said third composition ($RT_3$) and a selected shear rate ($\gamma_3$);
        wherein at least one of the following conditions is present:
        $BT_1 < BT_2$
        $RT_1 < RT_2$
        $\gamma_1 < \gamma_2$; and
        wherein at least one of the following conditions is present:
        $BT_3 < BT_2$
        $RT_3 < RT_2$
        $\gamma_3 < \gamma_2$; and
        wherein said first and third extrudates each provide a portion of an outer layer and said second extrudate provides a core, and wherein the first and third extrudates are each directly bonded to the second extrudate forming the core and completely surround the second extrudate forming the core;
        wherein said nutritional additive of said first composition is a thermally degradable and/or shear degradable nutrient additive;
        wherein said nutritional additive of said first composition is not present in the second composition; and
        wherein said nutritional additive of said first composition comprises a vitamin or mineral or herb, wherein 75% or more by weight of said nutritional additive in said composition remains non-degraded after processing in said first extruder.

2. The process of claim 1 wherein at least two of the following conditions are present: $BT_1 < BT_2$; $RT_1 < RT_2$; $\gamma_1 < \gamma_2$.

3. The process of claim 1 wherein the following conditions are present: $BT_1 < BT_2$; $RT_1 < RT_2$; $\gamma_1 < \gamma_2$.

4. The process of claim 1 wherein at least two of the following conditions are present: $BT_3 < BT_2$; $RT_3 < RT_2$; $\gamma_3 < \gamma_2$.

5. The process of claim 1 wherein the following conditions are present $BT_3 < BT_2$; $RT_3 < RT_2$; $\gamma_3 < \gamma_2$.

6. The process of claim 1 wherein said first and second compositions comprise one of a starch, a gluten, a carbohydrate, rawhide or meat.

7. The process of claim 1 wherein said first and second compositions comprise raw starch.

8. A process for forming a pet chew comprising:
providing a first extruder operable with a first extruder die providing a first extruder die profile shape, a second extruder operable with a second extruder die providing a second extruder die profile shape and a third extruder operable with a third extruder die having a third extruder die profile shape;
providing a first composition containing a nutritional additive to said first extruder and a second composition to said second extruder and a third composition containing a nutritional additive to said third extruder;
extrusion processing said first composition through said first extruder and said first extruder die to form a first extrudate having a first extrudate profile shape;
extrusion processing said second composition through said second extruder and said second extruder die to form a second extrudate having a second extrudate profile shape;
extrusion processing said third composition through said third extruder and said third extruder die to form a third extrudate having a third extrudate profile shape;
joining said first extrudate, said second extrudate and said third extrudate to one another with a combining die located downstream of the first extruder die, the second extruder die and the third extruder die;
wherein said first extruder is operating at a selected barrel temperature ($BT_1$), including a selected residence time for said first composition ($RT_1$) and a selected shear rate ($\gamma_1$);
wherein said second extruder is operating at a selected barrel temperature ($BT_2$), a selected residence time for said second composition ($RT_2$) and a selected shear rate ($\gamma_2$);
wherein said third extruder is operating at a selected barrel temperature ($BT_3$), a selected residence time for said third composition ($RT_3$) and a selected shear rate ($\gamma_3$);
wherein the following conditions are present:
$BT_1 < BT_2$
$RT_1 < RT_2$
$\gamma_1 < \gamma_2$; and
wherein the following conditions are present:
$BT_3 < BT_2$
$RT_3 < RT_2$
$\gamma_3 < \gamma_2$; and
wherein said first and third extrudates each provide a portion of an outer layer and said second extrudate provides a core, and wherein the first and third extrudates are each directly bonded to the second extrudate forming the core and completely surround the second extrudate forming the core;
wherein said nutritional additive of said first composition is a thermally degradable and/or shear degradable nutrient additive;
wherein said nutritional additive of said first composition is not present in the second composition; and
wherein said nutritional additive of said first and third composition comprises a vitamin or mineral or herb, wherein 75% or more by weight of said nutritional additive in said first and third composition remains non-degraded after processing in said first and third extruders.

9. The process of claim 8 wherein said first, second and third compositions comprise one of a starch, a gluten, a carbohydrate, rawhide or meat.

10. The process of claim 8 wherein said first, second and third compositions comprise raw starch.

* * * * *